Nov. 19, 1940.  C. W. MOTT  2,222,116
TRACTOR JACK
Filed Dec. 8, 1939
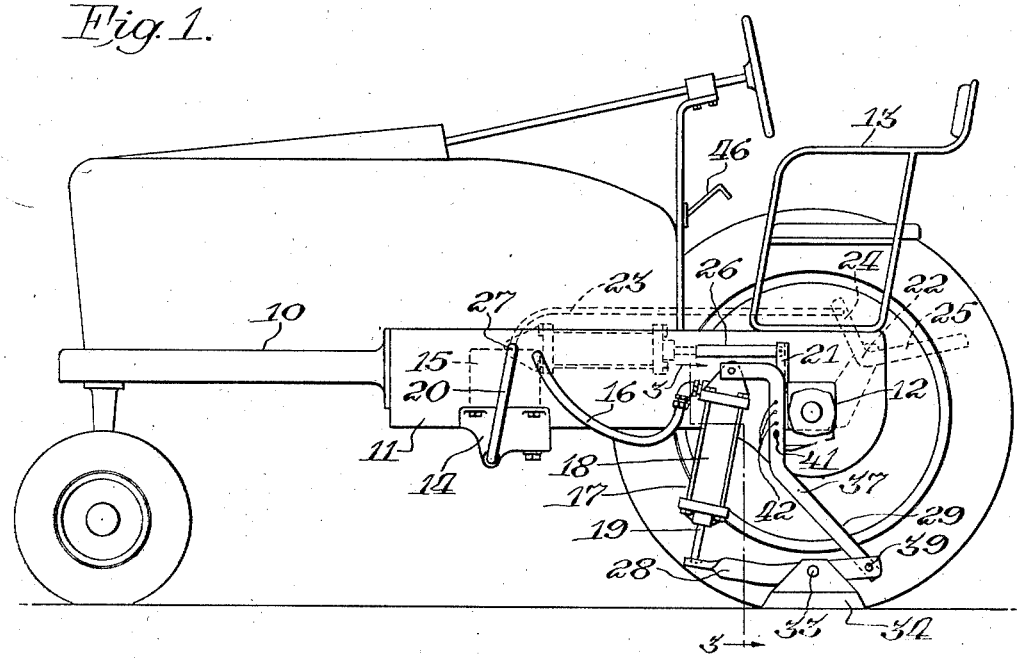
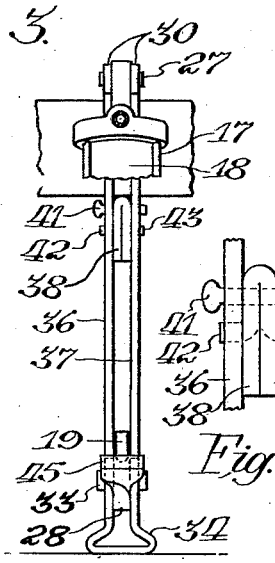
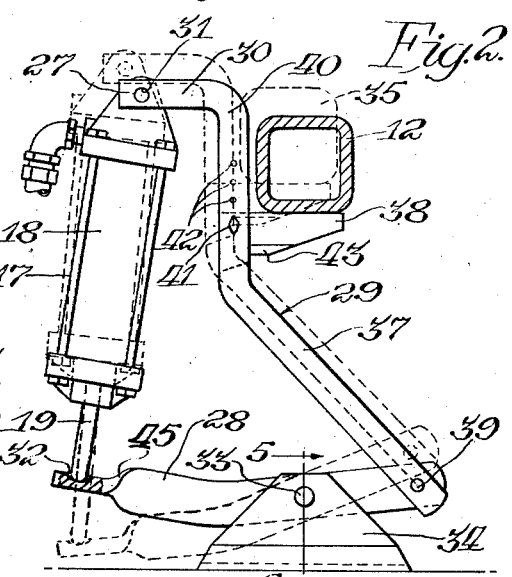
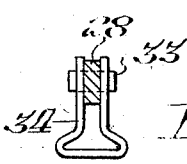
Inventor
Carl W. Mott
By Paul O. Pippel
Atty.

Patented Nov. 19, 1940

2,222,116

UNITED STATES PATENT OFFICE 2,222,116

TRACTOR JACK

Carl W. Mott, La Grange, Ill., assignor to International Harvester Company, a corporation of New Jersey Application December 8, 1939, Serial No. 308,288

10 Claims. (Cl. 254—124)

This invention relates to tractor jacks, and it is an object of this invention to provide a jack frame arrangement which is adaptable to have fitted thereto a hydraulic cylinder means normally carried by the tractor for the purpose of lifting implements associated with the tractor, whereby the same cylinder may be also used for lifting the tractor.

Another object of the invention is to provide such a frame which is of simple construction and which has connections making the attachment of the cylinder readily applicable.

It is still another object of the invention to provide an arrangement which has such flexibility that it may be readily located in its position for raising of the tractor.

According to the present invention, there has been provided a jack frame structure consisting of three members, one of which being capable of extension, a second member taking the form of a lever fulcrumed at an intermediate point along its length, and a third member providing for the attachment of the jack to the tractor, all three of the members being pivoted with respect to each other.

The member capable of extension includes the lifting cylinder, which is normally used in connection with the tractor for the lifting of implements, but the attachment of the same with the tractor being such that it may be readily removed to provide one of the three members of the tractor jack. When fluid is passed into the cylinder from the tractor, the members change their angular relation with respect to each other to thereby effect a lifting elongation of the arrangement. When the jack is not in use the cylinder can be readily removed from the same and placed back onto the tractor.

For a better understanding of the invention, reference may be had to the following detailed description taken in connection with the accompanying drawing, in which:

Figure 1 is a view in elevation of a tractor with one of the rear wheels removed and showing the adaptation of the hydraulic jack arrangement located for the lifting of the rear axle of the tractor;

Figure 2 is an enlarged view in elevation of the tractor jack arrangement, and similar to that shown in Figure 1;

Figure 3 is a view in elevation taken along the line 3—3 of Figure 1, showing part of the extensible member removed;

Figure 4 is an enlarged detail view showing the connection of the article engaging part with the upright member; and, Figure 5 is a view taken along the line 5—5 of Figure 2 showing the fulcrumed location of the lever member and the foot member.

Referring now to the drawing, there is shown generally a tractor 10, having a transmission and differential housing 11 and a rear axle structure 12 extending laterally on the both sides from the transmission and differential housing. On the rear of the tractor there is an operator's station 13.

This tractor is of a type adapted to have a pump and valve control housing 14 connected to the transmission and differential housing for the purpose of being driven thereby at a location presentable from the under portion of the tractor and intermediate the ends of the tractor. This housing has a portion 15 extending within the housing 14 from which there may be taken the hydraulic outlet hose 16 communicating with the cylinder extending member 17 to supply the same with hydraulic energy. This cylinder consists generally of a cylinder part 18 and a movable piston part 19.

The cylinder forms normally the lifting means for lifting implements carried directly on the tractor at which time its forward portion is supported on a pivotal link 20 pivoted on the pump housing 14. The rear portion of same is supported on a vertically extending bracket 21 fixed to the rear axle housing of the tractor. Connection is made with a rock-shaft 22 through a forwardly extending link 23 having connections with the cylinder part 18 at its forward end and at its rear end with an arm 24 rigidly connected with the rock-shaft 22. Extending rearwardly from the rock-shaft, are lifting arms 25 which may be connected, through the usual lifting rods, with the implement adapted to be carried on the tractor. Since the connection of implements with the tractor does not form a part of the present invention, the same is not shown but it should be understood that the implements are merely pivoted in their usual manner and adapted to be given lifting power from a rockable member 22 on the rear of the tractor.

The upright bracket 21 has pivoted thereto a sleeve 26 into which the piston rod 19 may be readily inserted for connection of the cylinder with the bracket 21. By such a construction it should be readily seen that the cylinder extensible means may be readily removed from the bracket portion 21 of the tractor. To remove the same from the pivotal lever 20, it is only necessary to withdraw the pin 27. The hose 16 being flexible, the cylinder may be readily removed to a position remote from its normal supporting means on the tractor.

In Figure 2, there is shown an enlarged view of the tractor jack. It can be seen that the members 28 and 29, when provided with the cylinder extensible member 17, provide a triangular arrangement of members, there being a lever member 28 and an upright member 29 and all three of the members having pivotal connections respectively, with respect to each other. The cylinder means 17 when removed can be readily connected with a laterally extending portion 30 of the upright member 29 by merely inserting the pin 27, which was used for connection of the cylinder means 17 with the link 20, in the hole 31. On the end of the lever with which the piston rod 19 contacts there is provided a socket portion 32 so that the end of the piston rod may be readily inserted for pivotal connection with respect to the lever 28. It should now be readily seen that when the cylinder means 17 is extended that the lever member 28 being fulcrumed at 33 on a foot member 34, will cause the upright member 29 to be moved vertically upward, and that there will be changing of the angular relationship of the parts to effect a lifting elongation of the arrangement. This change in the arrangement of the members is shown in dotted lines in Figure 2 with the housing 12 raised to a new position as indicated at 35.

The upright member 29 is formed of two spaced parallel parts 36 and 37, see Figures 3 and 4, to provide for the insertion of an article engaging part 38 as well as for the connection of the cylinder means 17 and of the connection with the lever 28 at 39; while the upright member 29 is so positioned as to have a general vertical inclination with the horizontal, it has a portion 40 that extends exactly vertical, when the tractor jack is located under the tractor, with respect to the vertical face of the axle housing 12. By having this portion of the member 29 extend vertically, it aids the operator in definitely adjusting the jack under the tractor in that he can note the angular relationship of this portion 40 with the face of the axle housing. When the operator has noted that the portion 40 is parallel with the face of the axle housing 12, he will know that the tractor jack is properly adjusted with respect to the tractor. The article engaging part 38 is connected to this vertical portion 40 so that its contacting edge is at right angles therewith. Also, when the jack is properly alined with respect to the axle housing 12, the fulcrum point 33 becomes vertically alined with the article engaging part 38 so that it will be immediately under the rear axle housing or that portion of the tractor to be raised.

The article engaging part 38 takes the form of a plate bent back on itself to form a U as shown particularly in Figure 4. This part 38 has a hole therethrough for its connection to the vertical portion 40 of the upright member 29 by means of a pin 41 in any of a number of locations represented by holes 42 in the portion 40 thereof. Part 38 when fixed between the parts 36 and 37 on the member 29 are arranged so that the closed portion of the U is on top to contact the tractor. In order to maintain the part 38 extended there is provided on the lower part thereof, at each side, flared or wing portions 42 and 43 to provide shoulders with which to abut the forward faces of the respective members, 36 and 37 of the member 29. With the part 38 maintained in this manner, it makes for a simple adjustment of the same with respect to the vertical portion 40 of the member 29.

Referring now to Figure 3, there is shown in detail the foot member 34 and the lever 28 fulcrumed therein. The recess 32 for the piston rod 19 is formed in a portion 45 twisted as is indicated in Figure 2 with respect to the main portion of the lever 28. By such an arrangement, a larger recess 32 may be obtained than would otherwise be obtained should the narrow top portion of the lever be presented to the end of the piston rod 19. Once the cylinder is placed in its location as part of the jack frame, it is only necessary to start operation of the pump 14. This is done by operating the pump control rod 46 accessible to the operator's station 13. This pump and control housing 14 is such that when the cylinder has lifted to effect maximum elongation of the arrangement, the same will by-pass fluid back to a fluid reservoir and such fluid that has passed the cylinder is maintained by a trap valve. This pump and valve arrangement is generally of the same construction as that shown in the applicant's pending application, Serial No. 233,966, filed October 8, 1938.

It should now be seen that according to the present invention, there has been provided a jack where the extensible member which normally forms a part of the tractor may form one of the members of a triangular arrangement of members for providing a structure that is elongated to effect lifting of a tractor, and that such an arrangement provides a structure where the working part of the jack need not be duplicated. The owner of the tractor with a cylinder lifting means, has, therefore, with little additional expense, a tractor jack for the lifting of his tractor.

While various changes may be made in the detail construction of the present arrangement, it shall be understood that such changes shall be made within the spirit and scope of the present invention as defined in the appended claims.

What is claimed is:

1. A jack frame adapted to have a cylinder fitted therein to provide lifting power comprising two members pivotally connected to each other and one of the members fulcrumed to be given a lever effect, and means associated with each of said members for the fitting of a lifting cylinder to provide the power for causing lever action of said lever member and the pivoting between the two members.

2. In combination, a tractor, a hydraulic arrangement associated with the tractor to be operated thereby including a hydraulic pump and a fluid operable lifting cylinder, a jack frame adapted to engage the tractor comprising two members pivotally connected to each other and with one of the same fulcrumed to provide a lever effect, and means associated with each of said members for the fitting of said lifting cylinder to provide the power for the jack frame to cause lever action of one of the members and pivoting of both members, whereby said tractor may be lifted under its own power.

3. A jack having members triangularly arranged, and pivotally connected to each other, one of said members adapted to be extended and another of said members fulcrumed at a location between its connection with the other two members, whereby upon the extension of said first member the angular relationship between the respective members will be changed to effect lifting elongation of the triangular arrangement.

4. A jack having members triangularly arranged and pivotally connected to each other, one of said members adapted to be extended, the second member having an article engaging part, a foot member, and the third member fulcrumed on said foot member at a location between its connection with the other two members, the arrangement being so that the fulcrum point will be vertically alined with said article engaging part, and means for extending said first mentioned member to change the angular relationship between the respective members, whereby lifting elongation of the arrangement will be effected.

5. In a tractor jack, three members triangularly arranged, one of said members adapted to be extended, another of said members fulcrumed to provide lever action, and the third member being an upright member generally inclined with the horizontal but having a vertically extending portion adapted as a guide in alining the members with the article to be lifted, an article-engaging part, and means for adjacently positioning the article-engaging part to different elevations.

6. An article-engaging part adapted to be connected to the upright member of a jack structure where the said upright member includes two spaced parts, formed of a plate folded back on itself and having a portion along the location of its fold adapted for pivoted attachment between the spaced parts, and having wing portions set out on each side of the unfolded edge to abut respectively the spaced parts.

7. In a tractor jack, three members triangularly arranged, one of said members taking the form of a cylinder extensible means including a cylinder part and a piston rod part, another of said members fulcrumed to provide lever action, a third and article-engaging member pivoted to the lever member and having a portion adapted for the engagement of said cylinder part, and said lever having a socket portion adapted for the pivotal engagement of the end of said piston rod part.

8. In a tractor jack, three members triangularly arranged, one of said members taking the form of a cylinder extensible means including a cylinder part and a piston rod part, another of said members fulcrumed to provide lever action, a third and article-engaging member pivoted to the lever member and having a portion adapted for the engagement of said cylinder part, a foot member, said lever being of rectangular cross-section and pivoted to said foot member with a narrow edge faced up, a portion of said lever twisted to provide an enlarged face and said portion having a socket for the insertion of the end of said piston rod part.

9. In a tractor jack, three members triangularly arranged, one of said members taking the form of a cylinder extensible means including a cylinder part and a piston rod part, another of said members fulcrumed to provide lever action, a third and article-engaging member pivoted to the lever member and having a portion adapted for the engagement of said cylinder part, and said third member being generally inclined but having a horizontally extending portion to which said cylinder is pivotally engageable.

10. In combination, a tractor, a hydraulic arrangement associated with the tractor to be operated thereby including a hydraulic pump and a fluid operable lifting cylinder having a fluid connection with the pump to permit the cylinder to be moved bodily with respect to the pump, means for removably connecting the lifting cylinder to the tractor, a jack frame adapted to engage a portion of the tractor, and said jack frame having means for removably connecting said cylinder therewith when removed from its normal supporting means on the tractor to provide lifting power therefor, whereby said cylinder may be either carried by the tractor or connected to the lifting jack frame so that the tractor may be lifted under its own power.

CARL W. MOTT.